United States Patent Office 3,751,440
Patented Aug. 7, 1973

3,751,440
METAL COMPLEXES OF N,N-DIALKYLESTERS OF ETHYLENEDINITRILOTETRAACETIC ACID AND AND COMPOSITIONS STABILIZED THEREBY
John D. Spivack, Spring Valley, N.Y., assignor to Ciba-Geigy Corporation, Greenburgh, N.Y.
No Drawing. Filed Aug. 30, 1971, Ser. No. 176,307
Int. Cl. C07f 15/04, 11/00, 13/00
U.S. Cl. 260—439 R      4 Claims

ABSTRACT OF THE DISCLOSURE

Synthetic polymeric compositions which are subject to ultraviolet light deterioration are stabilized by means of an effective amount of a metal complex of N,N'-alkyl esters of ethylenedinitrilotetraacetic acid. Polymeric compositions containing these stabilizers also exhibit an increase in susceptibility to dye as compared to the unstabilized polymeric compositions. A typical embodiment is the nickel complex, N,N'-di-n-octadecyl ester of ethylenedinitrilotetraacetic acid.

DETAILED DISCLOSURE

The present invention relates to novel metal derivatives of N,N'-dialkyl esters of ethylenedinitrilo tetraacetic acid and the use thereof in the preparation of synthetic polymeric compositions of increased stability to ultraviolet (UV) light and increased susceptibility to dye.

More specifically, this invention relates to a compound of the formula:

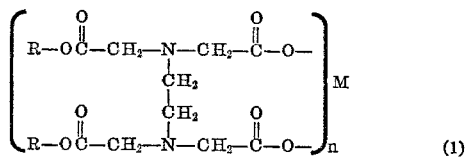

wherein R is an alkyl group of from 1 to 22 carbon atoms; M is selected from the group consisting of zinc, manganese, nickel, cobalt, chromium, copper, aluminum, titanium and iron, and $n$ has a value of from 1 to 4, the value of $n$ being the same as the available valence of M.

By the term alkyl is intended a branched or straight chain saturated hydrocarbon group having from 1 to 22 carbon atoms. Typical of such alkyl groups are methyl, ethyl, propyl, isopropyl, butyl, t-butyl, pentyl, isopentyl, hexyl, octyl, dodecyl, tetradecyl, hexadecyl, octadecyl, eicosyl, docosyl and the like.

The group $n$ consists of a metal cation such as the cation form of lithium, sodium, potassium, barium, calcium, aluminum, titanium, tin, vanadium, antimony, chromium, molybdenum, manganese, iron, cobalt, copper and the like, that is, a metal having an atomic number of up to 56. The preferred metal cations are zinc, manganese, nickel, cobalt, chromium, copper, aluminum, titanium and iron. The most preferred is nickel.

This invention also relates to compositions of matter which are stabilized against ultraviolet deterioration which comprises a synthetic organic polymer normally subject to ultraviolet deterioration containing from about 0.05% to 10% by weight of the polymer of the compounds of Formula 1 and preferably from 0.2% to 5% by weight.

The compounds of the present invention also render synthetic polymeric substances, such as the poly-α-olefins of the polyethylene and polypropylene type, more amenable to dyeing and also reduce the tendency of the polymeric substance to discolor and embrittle upon exposure to light, whether dyed or not. These compounds may be incorporated in the polymeric substance during the usual processing operations, for example by hot milling, the composition then being extruded, pressed, blow molded or the like into films, fibers, filaments, hollow shapes and the like. Moreover, polymeric compositions containing these novel salts may be dyed, either directly after incorporation of the salt or after further processing, such as the formation of yarns or fabrics. The polymer is stabilized by the presence of these metal salts both before and after dyeing so that the coloring step need not follow directly. Once dyed, the colored compositions exhibit fastness to light and to solvents, properties preferred in washing, dry cleaning and general use.

The conditions of the dyeing will of course vary with the particular dye employed. Generally the nature of the dye is not restricted and any of the many known metal chelating dyes may be employed, as for example, the orange dye of the formula:

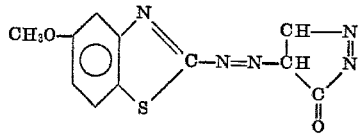

It is also to be understood that the effect obtained with a particular dye can be altered by variation of the particular metal cation of these compounds and by the amount of these compounds present in the polymer, although generally from about 0.05 to 10% preferably 0.1 to 5% by weight, is employed.

While polypropylene has been herein mentioned specifically, these compounds are useful in numerous other substances whose regular and inert polymeric structures tend to resist dyes and are subject to UV deterioration. Materials for which the compounds of the present invention are useful thus include synthetic organic polymeric substances, both homopolymeric and copolymeric, such as vinyl resins formed from the polymerization of vinyl halides or from the copolymerization of vinyl halides with unsaturated polymerizable compounds, e.g., vinyl ester, α,β-unsaturated acids, α,β-unsaturated esters, α,β-unsaturated ketones, α,β-unsaturated aldehydes and unsaturated hydrocarbons such as butadienes and styrene; poly-α-olefins such as polyethylene, polypropylene, polybutylene, polyisoprene and the like, including copolymers of poly-α-olefins; polyurethanes such as are prepared from polyols and organic polyisocyanates; polyamides, such as polyhexamethylene adipamide; polyesters such as polymethylene terephthalates; polycarbonates; polyacetals; polystyrene; polyethyleneoxide; polyacrylics such as polyacrylonitrile; and the like, including mixtures of the foregoing such as those of high impact polystyrene containing copolymers of butadiene and styrene and those formed by the copolymerization of acrylonitrile, butadiene and/or styrene. The compounds of this invention may be used for stabilizing the above materials even when dyeing is not anticipated.

Other materials which while not generally dyed, are nevertheless stabilized against UV deterioration by the compounds of the present invention include lubricating oil of the aliphatic ester type, e.g., di-(2-ethylhexyl) azelate, pentaerythritol tetracaproate and the like; animal and vegetable derived oils, e.g., linseed oil, fat, tallow, lard, peanut oil, cod liver oil, castor oil, palm oil, cotton seed oil and the like; hydrocarbon material such as gasoline, both natural and synthetic, diesel oil, mineral oil, fuel oil, cutting fluids, waxes, resins and the like; fatty acids; varnishes, soaps; and the like.

The stabilizers employed in this invention can be also used in combination with other stabilizers or additives. There may also be present compounds which help to improve the heat and oxidative stability of polymers such as phenolic compounds which inactivate free radicals, by hydrogen atom donation, as well as, compounds capable of decomposing peroxides such as dilaurylthiodipropionate. The stabilizers may also be used in combination with other additives such as UV light absorbers, anti-acids such as calcium soaps, phosphates, anti-static agents, and the like. Other materials which may also be incorporated into the polymer composition include for example, pigments, dyes, fillers, etc.

The stabilized polymers of the present invention have utility in the normal uses for which plastics are employed and are particularly useful for film, coatings and fiber.

The compounds of the present invention per se, can be prepared by treating the appropriate dialkyl ester of ethylenedinitrilotetraacetic acid with the reactive form of the metal or complex, e.g., sodium hydroxide, lithium hydroxide, potassium hydroxide or the like. Alternatively, and preferably in the case of metal complexes and metals other than alkali metals, a double decomposition is employed. Thus, for example, a sodium salt of the present invention is treated with nickel chloride. In a similar fashion, use of other halides such as aluminum chloride, barium chloride and the like results in formation of the corresponding metal derivative.

The preparation of the N,N'-dialkyl esters of ethylenedinitrilotetraacetic acid that are used as starting materials in preparing the compounds of this invention are described in U.S. Pat. No. 3,497,535. The N,N'-dialkyl esters of ethylenedinitrilotetraacetic acid, can conveniently be prepared by the reaction of ethylenedinitrilotetraacetic acid dianhydride and suitable alcohols.

The following examples, presented for illustration and not limitation, will serve to typify the nature of the present invention.

EXAMPLE 1

Nickel complex of N,N'-di-n-octadecyl ester of ethylenedinitrilotetraacetic acid A solution of 11.16 grams of the di-n-octadecyl ester of ethylenedinitrilo tetraacetic acid (0.014 mole) in 1 liter of isopropanol was converted to a solution of the dipotassium salt by the addition of 28.0 ml. of 1 normal methanolic potassium hydroxide. To this solution was added 3.32 grams of nickel chloride hexahydrate (0.014 mole) at a temperature of 10° C. The turbid reaction mixture was stirred at 23° to 25° C. for 2½ hours and at 50° C. for 20 minutes. The reaction mixture was then clarified by filtration, the clear filtrate being concentrated by distillation at 45° C. and 15 mm. mercury. The isolated residue was dissolved in 100 ml. of benzene, filtered, and the residue isolated by distillation of the solvent at 40°–45° C. at a pressure of 0.10 mm. Hg for 3 hours.

Analysis.—Calcd.: nickel, 6.88%. Found: nickel, 6.45%.

EXAMPLE 2

By following the procedure of Example 1 and substituting the following metal complexes for nickel chloride, (a) Manganese chloride
(b) Zinc chloride
(c) Cobalt chloride
(d) Chromium chloride
(e) Copper chloride
(f) Aluminum chloride
(g) Titanium chloride
(h) Ferric chloride There are thus respectively obtained:

(a) Manganese complex of N,N'-di-n-octadecyl ester of ethylenedinitrilotetraacetic acid.
(b) Zinc complex of N,N'-di-n-octadecyl ester of ethylenedinitrilotetraacetic acid.
(c) Cobalt complex of N,N'-di-n-octadecyl ester of ethylenedinitrilotetraacetic acid.
(d) Chromium complex of N,N'-di-n-octadecyl ester of ethylenedinitrilotetraacetic acid.
(e) Copper complex of N,N'-di-n-octadecyl ester of ethylenedinitrilotetraacetic acid.
(f) Aluminum complex of N,N'-di-n-octadecyl ester of ethylenedinitrilotetraacetic acid.
(g) Titanium complex of N,N'-di-n-octadecyl ester of ethylenedinitrilotetraacetic acid.
(h) Iron complex of N,N'-di-n-octadecyl ester of ethylenedinitrolotetraacetic acid.

EXAMPLE 3

By following the procedure of Example 1 and substituting the following dialkyl esters of ethylenedinitrilotetraacetic acid:

(a) N,N'-dimethyl ester of ethylenedinitrilotetraacetic acid
(b) N,N'-dibutyl ester of ethylenedinitrilotetraacetic acid
(c) N,N'-di-n-dodecyl ester of ethylenedinitrilotetraacetic acid there are thus respectively obtained:

(a) Nickel complex of N,N'-dimethyl ester of ethylenedinitrilotetraacetic acid
(b) Nickel complex of N,N'-di-n-butyl ester of ethylenedinitrilotetraacetic acid
(c) Nickel complex of N,N'-di-n-dodecyl ester of ethylenedinitrilotetraacetic acid.

EXAMPLE 4.—LIGHT STABILIZATION TESTS (A) Outdoor exposure tests (a) Sample preparation: 5 mil oriented monofilaments.—The nickel complex of di-n-octadecyl ester of ethylenedinitrilo tetraacetic acid was dissolved in distilled methylene chloride and blended with polypropylene (Hercules Profax 6501) in a Hobart mixer. A buffer (such as calcium stearate) and antioxidant (di-octadecyl (3,5-di-t-butyl-4-hydroxybenzyl) phosphonate) were added to the polymer blend. To facilitate moisture removal all blends are vacuum dried shortly before extrusion. Samples were also prepared containing the additional UV stabilizer (2-(3,5-di-t-butyl-2'-hydroxyphenyl)-5'-chlorobenzotriazole.

Samples were processed as follows:

(1) Compounding and pelletizing:
  1" extruder: $L/D=20/1$ at 40 r.p.m.
  Melt temperature: 450° F.
(2) Monofilament:
  Melt temperature: 500° F.
  1" extruder: $L/D=24/1$ at 20 r.p.m.
  Spinnerette: 1 hole, 20 mil diameter/hole Air cooling was accomplished by spinning into a cooling tower 6' x 6" x 5" fitted with a fan delivering 65 c.f.m. of air.

(3) Filament take-up: The cooled monafilament was wound on Godet rolls at a filament speed of 500 ft./min.
(4) Orientation:
  Godet temperature: 257° F.
  Orientation ratio: 4:1

(b) Test method for weathering stability.—The monofilament was exposed 45° south direct in Florida. Tensile measurements were performed at each exposure interval with the Instron Model TM.

The results indicated below show the number of kilolangleys (kl.) to 50% retention of tensile strength. A Langley is a measure of energy in the ultraviolet region to which the samples have been exposed.

Formulation:  Kl. to 50% retention of tensile strength
  (a) 0.5% nickel complex of N,N'-di-n-octadecyl ester of ethylenedinitrilotetraacetic acid; 0.2% di-octadecyl (3,5 - di-t-butyl-4-hydroxybenzyl) phosphonate; 0.1% calcium stearate _____ 63

| Formulation: | Kl. to 50% retention of tensile strength |
|---|---|
| (b) 0.5% nickel complex of N,N'-di-n-octadecyl ester of ethylenedinitrilotetraacetic acid; 0.5% 2 - (3,5'-di-t-butyl-2'-hydroxyphenyl)-5'-chlorobenzotriazole; 0.2% di-octadecyl(3,5-di-t-butyl-4-hydroxybenzyl) phosphonate; 0.1% calcium stearate | 160 |
| (c) 0.2% di-octadecyl(3,5 - di-t-butyl-4-hydroxybenzyl) phosphonate; 0.1% calcium stearate | 34 |

Improved stabilization of polypropylene to UV light is also obtained when the zinc, manganese, nickel, cobalt, chromium, copper, aluminum, titanium, and iron complexes of di-n-octadecyl ester of ethylenedinitrilo tetraacetic acid is substituted in each case for the above mentioned nickel complex.

(B) Artificial light exposure test

Deterioration of most polymers caused by ultraviolet light is so slow at ambient temperatures, even in the absence of stabilizers, that testing of the effects of stabilizers generally must be conducted either at higher temperatures or in an accelerated artificial light exposure device in order to yield results in a convenient period of time. The tests conducted on polymers using an artificial light exposure device is described below:

(a) Sample preparation: 25 mil plaques.—Unstabilized polypropylene powder (Hercules Profax 6501) is thoroughly blended with the indicated amounts of additives. The blended material is then milled on a two roll mill for 5 minutes at 182°. The milled sheet is then compression molded at 220° C. into 25 mil thick plaques under a pressure of 175 p.s.i. and water cooled in the press.

(b) Testing method: This test is conducted in a FS/BL unit, basically of the American Cyanamid design, which consists of 40 tubes of alternating fluorescent sun lamps and black lights (20 of each). The 25 mil sample plaques which are mounted on white cardboard stock are placed on a rotating drum 2 inches from the bulbs. The plaques are exposed in the FS/BL unit until they become sufficiently brittle to break cleanly when bent 180°. The results are recorded as hours of exposure to embrittlement.

The test results reported below were obtained according to the procedures described above. The amounts of the additives are expressed in weight percent based on the weight of the polymer.

| Formulation: | Hours to brittleness |
|---|---|
| (a) 0.5% nickel complex of N,N'-di-n-octadecyl ester of ethylenedinitrilotetraacetic acid (Ex. 1); 0.1% of di-octadecyl (3,5-di-t-butyl-4-hydroxybenzyl) phosphonate (di-octadecyl)[1] | 110 |

[1] 3,5-di-t-butyl-4-hydroxybenzyl) phosphate is an antioxidant which aids in processing the polymer.

When compared to a sample of unstabilized polypropylene tested according to this same procedure the stabilized sample containing the nickel complex was significantly more stable.

Improved stabilization of polypropylene is obtained when the nickel complex of dimethyl, dibutyl and di-n-dodecyl esters of ethylene dinitrilo tetraacetic acid is used in place of the nickel complex of the di-n-octadecyl ester.

EXAMPLE 5

Nickel complexes of the dimethyl, di-n-dodecyl and di-n-octadecyl esters of ethylenedinitrilotetraacetic acid are separately incorporated into polypropylene at a concentration providing a nickel concentration of 0.12%. The samples are then dyed with Poly Orange RM, Poly Dark Blue 2BM and Poly Brilliant Yellow GM. All the samples dye well with all the above dyes.

EXAMPLE 6

A composition comprising acrylonitrile-butadiene-styrene terpolymer and 1% by weight of the nickel complex of di-n-octadecyl ester of ethylenedinitrilotetraacetic acid resists embrittlement due to UV deterioration longer than one which does not contain the stabilizer.

A composition comprising polyurethane and 1.0% by weight of the tin complex of di-n-dodecyl ester of ethylenedinitrilo tetraacetic acid is more stable under fluorescent sunlamps, black lights and fluorescent lights than the unformulated polyurethane.

EXAMPLE 7

A stabilized linear polyethylene is prepared by incorporating therein 0.5% by weight of the aluminum complex of di-n-octadecyl ester of ethylenedinitrilotetraacetic acid.

A stabilized polyamide (nylon 6,6) is prepared by incorporating therein 0.1% of chromium complex of di-n-dodecyl ester of ethylene diamine tetraacetic acid.

What is claimed is:

1. A compound of the formula:

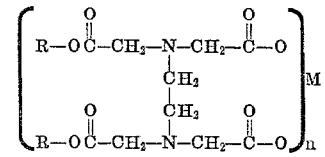

wherein

R is an alkyl group of from 1 to 22 carbon atoms;

M is selected from the group consisting of zinc, manganese, nickel, cobalt, chromium, aluminum, titanium and iron and n has a value of from 1 to 3, the value of n being the same as the available valence of M.

2. The compound of claim 1 wherein M is nickel.

3. The compound of claim 1 wherein R is n-octadecyl.

4. The compound of claim 3 which is the nickel complex of di-n-octadecyl ester of ethylenedinitrilotetraacetic acid.

References Cited

UNITED STATES PATENTS

| 2,859,104 | 11/1958 | Kroll | 260—429 J |
| 3,051,563 | 8/1962 | Bersworth | 260—429 J |
| 3,497,535 | 2/1970 | Lennon | 260— 482 P |

DANIEL E. WYMAN, Primary Examiner

A. P. DEMERS, Assistant Examiner

U.S. Cl. X.R.

8—172; 260—45.75 R, 45.75 N, 429 J, 429.5, 429.7, 429.9, 438.1, 438.5, 446, 448 B, 482 P